United States Patent [19]
Aron

[11] 3,856,547
[45] Dec. 24, 1974

[54] PROCESSING AIDS FOR POLY(VINYL CHLORIDE) RESINS
[75] Inventor: Erwin Aron, Clifton, N.J.
[73] Assignee: Technical Processing, Inc., Paterson, N.J.
[22] Filed: Oct. 16, 1973
[21] Appl. No.: 407,033

[52] U.S. Cl........ 106/316, 260/31.8 G, 260/31.8 K, 260/31.8 W, 252/364
[51] Int. Cl. .......................... C08f 45/44, C08k 1/44
[58] Field of Search.... 260/31.8 G, 31.8 K, 31.8 W; 106/316; 252/364

[56] References Cited
UNITED STATES PATENTS
2,575,553  11/1951  Kolvoort............................ 106/316
2,680,724  6/1954  Bowman......................... 260/31.8 G
2,818,415  12/1957  Dazzi............................. 260/31.8 K
2,824,018  2/1958  Cornwell........................ 260/31.8 K
3,110,603  11/1963  Reeves, Jr........................... 106/316

Primary Examiner—Morris Liebman
Assistant Examiner—S. L. Fox
Attorney, Agent, or Firm—Kenyon & Kenyon Reilly Carr & Chapin

[57] ABSTRACT

Compositions composed of an alkylphenoxy polyethylene glycol, an amine or quaternary ammonium salt of an organic acid and an amide facilitate blending of particulate poly(vinyl chloride) resins during fabrication of the resin into molded or extruded articles.

5 Claims, No Drawings

PROCESSING AIDS FOR POLY(VINYL CHLORIDE) RESINS

This invention relates to processing aids for thermoplastic resins. More particularly, this invention is concerned with processing aids for poly(vinyl chloride) resins.

BACKGROUND OF THE INVENTION

Thermoplastic resins such as poly(vinyl chloride) are commonly produced in particulate form, e.g., as pellets or powders. When the particulate resin is employed to manufacture an article, as by molding, extrusion, etc., the particles must first be melted and formed into a homogenous mass. In the past, this process of fusion has been aided through incorporation into the resin of primary plasticizers, which act as solvents for the resin. The plasticizers also improve the flow and shear characteristics of the resins during processing into the final article. That is, the molten resin is more readily formed into the desired shape due to its reduced viscosity. Although plasticizers have been widely employed to assist in molding thermoplastic resins, they are not entirely satisfactory in all cases. In some cases, it is desired that the fabricated article have physical properties, especially rigidity and stiffness, comparable to those of the thermoplastic resin itself. It has been found, however, that when primary plasticizers are employed in amounts sufficient to improve the processability of thermoplastic resins, they materially reduce the rigidity of the resin. It is desirable, therefore, that there be a processing aid which can be blended with a thermoplastic resin such as poly(vinyl chloride) in amounts sufficient to improve the processability of the particulate resin during fabrication without also materially reducing the rigidity of the fabricated resin.

SUMMARY OF THE INVENTION

It is an object of this invention to provide a new processing aid for thermoplastic resins such as poly(vinyl chloride).

It is a further object of this invention to provide a processing aid capable of facilitating fabrication of particulate thermoplastic resins into fabricated articles.

Still another object of this invention is the provision of a processing aid for thermoplastic resins which will not materially reduce physical properties, especially rigidity of the fabricated resin.

A still further object of this invention is to provide an improved process for fabricating thermoplastic resins.

These and other objects of this invention, which will be evident from the ensuing specification and claims, are achieved through a novel composition comprising a monoalkylphenoxy polyethylene glycol, an amine or quaternary ammonium salt of an organic acid, and an amide as hereinafter defined. These processing aids, when employed in small amounts in combination with primary plasticizers facilitate processing of particulate thermoplastic resins through reduction of the viscosity of the softened or molten resin. Moreover, they permit reduction of the amount of primary plasticizers to a level such that the rigidity of the fabricated resin is not materially reduced.

DESCRIPTION OF THE PREFERRED EMBODIMENT

The processing aids of this invention contain as essential ingredients a monoalkylphenoxy polyethylene glycol, a relatively non-volatile amine or quaternary ammonium salt and a relatively non-volatile amide. The processing aid optionally may contain polyethylene or polypropylene glycols and/or triglyceride oils.

The monoalkylphenoxy polyethylene glycols employed in accordance with this invention may be represented by the structural formula:

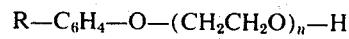

$$R-C_6H_4-O-(CH_2CH_2O)_n-H \quad (I)$$

wherein R is alkyl of from about 8 to about 12 carbons, including straight and branched-chain alkyl, and n is a number having a value of from about 3 to about 7. Illustrative compounds include nonylphenoxy tetraethylene glycol, nonylphenoxy heptaethylene glycol, dodecylphenoxy tetraethylene glycol and the like. The alkylphenoxy polyethylene glycols comprise a predominant portion, i.e., at least 50 weight per cent, of the processing aids of this invention. Proportions in the range of from about 50 to about 70 weight per cent are preferred.

The second component of the processing aid of this invention is a relatively non-volatile amine or ammonium salt of an organic acid. The salt should be sufficiently non-volatile that significant amounts will not evaporate from the resin mixture during processing. In general salts having vapor pressures of not greater than about 1 mm Hg at 20°C. are useful.

Suitable salts may be represented by the formulas:

$$[R^1R^2R^3R^4N][O_2CR^5] \quad (II)$$

and

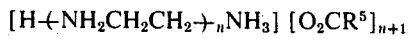

$$[H{+}NH_2CH_2CH_2{+}_nNH_3][O_2CR^5]_{n+1} \quad (III)$$

wherein each of $R^1$, $R^2$, and $R^3$, when taken separately, is hydrogen or alkyl, $R^4$ is alkyl, $O_2CR^5$ is a residue of a monohydric organic acid of molecular weight of at least about 146 and n is a number having a value of at least about 3.

The amines employed in forming the salts of Formula (II) may be primary, secondary or tertiary amines, with tertiary amines being preferred. At least one of $R^1$, $R^2$, $R^3$ and $R^4$ is higher alkyl, e.g., alkyl of at least about 10 carbons, and preferably of from about 10 to about 20 carbons. Preferred tertiary amines are those wherein $R^1$, $R^2$ and $R^3$ each are higher alkyl. Tri(tridecyl) amine is especially preferred.

The salts of Formula (III) are salts of polyethylene polyamines having at least 4 ethyleneamine ($-CH_2CH_2NH_2-$) units, i.e., wherein n in Formula (III) has a value of at least 3, and preferably is 3 or 4, i.e., tetraethylenepentamine and pentaethylenehexamine are preferred.

The acid employed in forming the salt can be any high molecular weight acid, with preferred acids being those which are free of active hydrogen atoms, i.e., free of active groups such as primary or secondary amine, hydroxyl, carboxyl, mercapto, etc. exclusive of the carboxyl group used for salt formation. Preferred acids are higher monohydric fatty acids, e.g., fatty acids of from about 8 to about 20 carbons, or alkyl substituted-benzoic acids of 8 to about 20 carbons. Monoesterified diacids may also be employed, including monoesters of aliphatic and aromatic diacids of from about 2 to about 10 carbons, i.e., esters of malonic acid, glutaric acid, phthalic acid and the like. The esterifying group can be alkyl, aryl, alkaryl, or alkyl-, aryl-, or alkaryl-substituted polyethyleneoxy. Preferred monoesterified diacids have the formula:

$$HO_2C—R^6—CO_2—(CH_2CH_2O)_x—R^7 \quad (IV)$$

wherein $R^6$ is alkylene or arylene of 2 to 10 carbons, $x$ has a value of from about 0 to about 5, and $R^7$ is alkyl, aryl, or alkaryl of up to about 20 carbons. Illustrative salts include the tri(tridecyl) amine salt of neodecanoic acid, the tri(tridecyl) amine salt of mono(nonylphenoxy tetraethyleneoxy) phthalate and the like.

The amine or ammonium salt is employed in the processing aid in a minor amount, i.e., an amount not greater than about 25 weight per cent. Amounts of from about 15 to about 25 weight per cent are preferred.

The final essential component of the processing aids of this invention is a relatively non-volatile amide. As was the case with the amine salt, the amide should be sufficiently non-volatile that a significant amount will not evaporate off during processing, with amides having vapor pressures of no greater than 1 mm Hg at 20°C. being useful.

Suitable amides are represented by the formulas:

$$R^8CONHR^9 \quad (V)$$

and

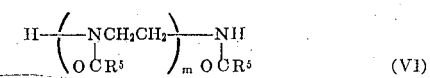

(VI)

wherein $R^5$ is as defined above, $R^8$ is alkyl of from 9 to about 19 carbons, $R^9$ is lower alkyl, e.g., alkyl of 1 to 4 carbons, or hydroxy lower alkyl, and $m$ is a number having a value of at least about 3, and preferably of from about 3 to about 4.

The amides of Formula (V) are N-lower alkyl or N-hydroxyalkyl substituted higher amides of from about 10 to about 80 carbons. Illustrative amides include isostearic ethanolamide, coconut oil acid monoethanolamide and the like.

The amides of Formula (VI) are amides of the acids discussed above with the polyalkylene polyamines discussed above. Isostearic tetraethylenepentamide is illustrative of this class of compounds.

The amides comprise a minor proportion, e.g., no more than 25 weight per cent of the processing aid of this invention. Preferred proportions are in the range of from about 5 to about 25 weight per cent.

In addition to the above-mentioned essential components, the processing aid of this invention may also contain polyethylene or polypropylene glycols or esters and ethers of the monoethers of such polyglycols. These compounds may be represented by the formula:

$$R^{10}—(OR^{11})_z—OR^{12} \quad (VII)$$

wherein $R^{10}$ is hydrogen, alkyl or aryl of 2 to 18 carbons, $R^{11}$ is ethylene or propylene, $z$ is a number having a value of at least 2 and preferably from 2 to 100, and $R^{12}$ is hydrogen, alkyl, aryl or acyl of 1 to 3 carbons. Illustrative compounds of this class include tripropylene glycol, polypropylene glycol having a molecular weight of about 4,000 and nonylphenoxy tridecaethyleneglycol acetate.

These polyglycol compounds are employed in small amounts, i.e., not more than 10 weight per cent of the processing aid. Amounts of from about 1 to 10 weight per cent are preferred when the polyglycol compound is present.

Finally, the processing aid of this invention may contain small amounts, i.e., less than 10 weight per cent, and preferably from about 1 to about 10 weight per cent of a triglyceride oil such as castor oil. As with the polyglycol compound, the triglyceride oil is optional.

The processing aids of this invention are readily prepared by conventional techniques. That is, the components are mixed in the desired proportions in a suitable mixer.

The processing aids of this invention are useful in aiding the fabrication of any thermoplastic polymer, such as polyethylene, polypropylene, polystyrene, poly(vinyl chloride) and the like. They are of particular use with poly(vinyl chloride). The processing aids are employed in amounts sufficient to improve the flow and shear characteristics of the resin which has been heated and subjected to pressure for fabrication into the final article. Amounts of from about 1 to about 10 weight per cent have been found suitable, although higher and lower amounts may be employed if desired.

The processing aid of this invention is employed in conjunction with a primary plasticizer for the particular resin. Such plasticizers are well known to the art, and include esters such as phosphates, phthalates, citrates, bis-benzoates and the like. Dialkyl phthalates such as dibutyl phthalate and dioctyl phthalate are preferred. A more complete listing of primary plasticizers can be found in the 1968 edition of Plastics Encyclopedia at pages 466–489, which is incorporated herein by reference. In general, the processing aid can be substituted for the primary plasticizer on at least an equal parts per weight basis. That is, the amount of primary plasticizer is reduced by an amount at least equal to the weight of the processing aid. For example, if 10 parts of plasticizer are conventionally employed with a thermoplastic resin, at least 2 parts of the plasticizer can be replaced by 2 parts of the processing aid. The resulting solid thermoplastic will have properties similar to those of the conventional plasticized resin, but the particulate resin will have reduced viscosity in the fluid state allowing for improved mixing prior to fabrication.

It is an advantage of the processing aids of this invention that they permit even further reductions in the amount of primary plasticizer. As a result one can obtain increased rigidity in the fabricated article and yet the particulate thermoplastic can be readily formed into the final article by virtue of the presence of the processing aid of this invention. Ordinarily, however, the amount of primary plasticizer will be at least about 1 weight per cent, based upon the thermoplastic resin. It is further preferred that the weight of primary plasticizer be no less than the weight of the processing aid of this invention.

The processing aid, primary plasticizer and thermoplastic resin are mixed together prior to fabrication of the resin into the finished article. Mixing is effected by employing conventional equipment and procedures. It is desired that mixing be conducted for a period of time and under conditions sufficient to provide a homogenous mixture.

By the term fabrication, as employed herein, is meant a process whereby particulate thermoplastic resin is formed under heat and pressure into an article, as by molding, including compression and injection molding, extrusion, etc. The resulting product, whether it be in the form of a molded part or unit, a sheet or other physical article, is referred to as the fabricated article.

The following illustrative processing aids of this invention were prepared by mixing the specified components in the proportions shown:

COMPOUND A 70.0 g Mono(nonylphenoxy) tetraethyleneglycol
20.0 g Tri(tridecylamine) neodecanoate
10.0 g. Coconut monoethanolamide

COMPOUND B 70.0 g Mono(nonylphenoxy) tetraethyleneglycol
20.0 g Tri(tridecylamine) neodecanoate
10.0 g Isostearic monoethanolamide

COMPOUND C 60.0 g Mono(nonylphenoxy) tetraethyleneglycol
10.0 g Mono(nonylphenoxy) heptaethyleneglycol
20.0 g Tri(tridecylamine) mono(nonylphenoxy) tetraethyleneglycol phthalate
10.0 g Isostearic monoethanolamide

COMPOUND D 60.0 g Mono(nonylphenoxy) tetraethyleneglycol
20.0 g Tri(tridecyl) neodecanoate
10.0 g. Isostearic monoethanolamide
10.0 g Tripropyleneglycol

COMPOUND E 55.0 g Mono(nonylphenoxy) tetraethyleneglycol
5.0 g Mono(nonylphenoxy) heptaethyleneglycol
20.0 g Tri(tridecylamine) neodecanoate
10.0 g Isostearic monoethanolamide
5.0 g Tripropyleneglycol
5.0 g Castor oil, USP

COMPOUND F 60.0 g Mono(nonylphenoxy) tetraethyleneglycol
20.0 g Tri(tridecylamine) neodecanoate
10.0 g Isostearic monoethanolamide
10.0 g Mono(nonylphenoxy) tridecaethyleneglycol acetate

COMPOUND G 50.0 g Mono(nonylphenoxy) heptaethyleneglycol
20.0 g Tri(tridecylamine) neodecanoate
4.0 g Tetraethylenepentamine isostearate
16.0 g Isostearic tetraethylenepentamide
9.0 g Tripropyleneglycol
1.0 g Polyproypleneglycol (4,000 Molecular Weight)

EXAMPLE I

A poly(vinyl chloride) resin formulation was prepared employing 100 parts of a medium molecular weight resin, 3.0 parts of a barium-cadmium-zinc stabilizer and 10.0 parts of dioctyl phthalate. Two additional formulations were prepared in which 2 parts of the dioctyl phthalate were replaced by 2 parts of Compound A or 2 parts of Compound B. Each of the three resin compositions was tested in a Brabender Plasticorder at 195°C. jacket temperature and a shear rate of 32 r.p.m. and the torque was determined. These tests are summarized as follows:

|  | Run No | | |
|---|---|---|---|
|  | 1 | 2 | 3 |
| Poly(vinyl chloride), pts. | 100 | 100 | 100 |
| Stabilizer, pts. | 3 | 3 | 3 |
| Dioctyl phthalate, pts | 10 | 8 | 8 |
| Compound A, pts. | 0 | 2 | 0 |
| Compound B, pts. | 0 | 0 | 2 |
| Torque, m-g | 1800 | 1700 | 1700 |

As is evident, replacement of 2 parts of the dioctyl phthalate with 2 parts of Compound A or Compound B substantially reduced the viscosity of the resin as indicated by the reduced torque.

EXAMPLE II

The procedures of Example I were repeated, except that the basic formulation contained 100 parts of low molecular weight poly(vinyl chloride), 3 parts barium-cadmium-zinc stabilizer and 2 parts dioctyl phthalate, and four additional formulations were prepared in which 1 part of the dioctyl phthalate was replaced by 1 part of Compound C, Compound D, Compound E or Compound F. The results of these tests are summarized as follows:

|  | Run No. | | | | |
|---|---|---|---|---|---|
|  | 1 | 2 | 3 | 4 | 5 |
| Poly(vinyl chloride), pts. | 100 | 100 | 100 | 100 | 100 |
| Stabilizer, pts. | 3 | 3 | 3 | 3 | 3 |
| Dioctyl phthalate, pts. | 2 | 1 | 1 | 1 | 1 |
| Compound C, pts. | 0 | 1 | 0 | 0 | 0 |
| Compound D, pts. | 0 | 0 | 1 | 0 | 0 |
| Compound E, pts. | 0 | 0 | 0 | 1 | 0 |
| Compound F, pts. | 0 | 0 | 0 | 0 | 1 |
| Torque, m-g | 1300 | 1225 | 1175 | 1150 | 1175 |

EXAMPLE III

The procedure of Example I was repeated, except that the basic formulation contained 100 parts of low molecular weight poly(vinyl chloride), 3 parts barium-cadmium-zinc stabilizer, 25 parts dibenzyl sebacate, and 25 parts dipropyleneglycol dibenzoate, two additional formulations were prepared in which 5 parts of the dibenzyl sebacate and 5 parts of the dipropyleneglycol dibenzoate were replaced by 10 parts of Compound B or Compound G.

Each of these three resin compositions was tested in the following manner:

2 g of the resin was evenly tapped down in a 2 inch diameter glass (culture) dish and put for 4 minutes in an oven at 195°C. It was then immediately pressed with a 1.75 inch diameter glass bottle stopper with 16 pounds pressure. After cooling the resulting film was removed from the dish and the thickness measured.

The test results are summarized as follows:

|  | Run No 1 | Run No 2 | Run No 3 |
| --- | --- | --- | --- |
| Poly(vinyl chloride), low molecular weight | 100.0 | 100.0 | 100.0 |
| Barium-Cadmium-Zinc Stabilizer | 3.0 | 3.0 | 3.0 |
| Dibenzyl sebacate | 25.0 | 20.0 | 20.0 |
| Dipropyleneglycol dibenzoate | 25.0 | 20.0 | 20.0 |
| Compound B | — | 10.0 | — |
| Compound G | — | — | 10.0 |
| Thickness of film, tested as described above | 0.031" | 0.025" | 0.018" |

What is claimed is:

1. A composition comprising an admixture consisting essentially of:
   a. from about 50 to about 70 weight percent of at least one monoalkyl phenoxy polyethylene glycol having from about 8 to about 12 carbons in the alkyl group thereof and from about 3 to about 7 ethyleneoxy units;
   b. from about 15 to about 25 weight percent of at least one amine or ammonium salt of an organic acid having a vapor pressure of not greater than 1 mm Hg at 20°C. selected from the group consisting of monoamine salts of monohydric organic acids or molecular weight of at least 146 and polyethylene polyamide salts of such acids where said polyethylene polyamide has at least 4 ethyleneamine units, there being one acid residue for each amine nitrogen of said polyalkylene polyamine; and
   c. from about 5 to about 25 weight percent of at least one amide having a vapor pressure of not greater than about 1 mm Hg at 20°C. selected from the group consisting of N-lower alkyl and N-hydroxy lower alkyl substituted higher amides of from about 10 to about 80 carbons and amides of monohydric organic acids of molecular weight of at least 146 and polyethylene polyamines having at least 4 ethyleneamine units, there being one acid residue for each amine nitrogen.

2. A composition according to claim 1 including at least one of:
   a. not more than 10 weight per cent of at least one polyglycol selected from the group consisting of polyethylene glycols and polypropylene glycols having from 2 to about 20 alkyleneoxy units and esters and ethers of monoethers of such polyglycols; and
   b. not more than 10 weight per cent of at least one triglyceride oil.

3. A composition according to claim 1 wherein said composition contains:
   a. at least one of monoalkylphenoxy polyethylene glycol selected from the group consisting of nonylphenoxy tetraethylene glycol, nonylphenoxy heptaethylene glycol and dodecylphenoxy tetraethylene glycol;
   b. at least one amine salt selected from the group consisting of tri(tridecylamine)neodecanoate, tri(tridecylamine) mono(nonylphenoxy) tetraethylene glycol phthalate and tetraethylenepentamine isostearate;
   c. at least one amide selected from the group consisting of coconut monoethanolamide, isostearic monoethanolamide and isostearic tetraethylenepentamide.

4. A composition according to claim 3 also including at least one of:
   a. at least one polyglycol selected from the group consisting of tripropylene glycol, mono(nonylphenoxy) tridecaethylene glycol acetate and polypropylene glycol having a molecular weight of about 4,000; and
   b. castor oil.

5. A composition according to claim 4 containing:
   a. at least one of mono(nonylphenoxy) tetraethylene glycol and mono(nonylphenoxy) heptaethylene glycol;
   b. Tri(tridecylamine) neodecanoate;
   c. Isostearic monoethanolamide;
   d. Tripropylene glycol; and
   e. Castor oil.

* * * * *

UNITED STATES PATENT OFFICE
CERTIFICATE OF CORRECTION

Patent No. 3,856,547     Dated December 24, 1974

Inventor(s)  Erwin Aron

It is certified that error appears in the above-identified patent and that said Letters Patent are hereby corrected as shown below:

Column 3, line 48, "10" to about 80" should read

--11 to about 24--.

Signed and Sealed this twenty-seventh Day of April 1976

[SEAL]

Attest:

RUTH C. MASON
Attesting Officer

C. MARSHALL DANN
Commissioner of Patents and Trademarks